L. GILES AND S. H. WOODRUFF.
AERIAL TORPEDO.
APPLICATION FILED JULY 23, 1917.
1,384,559.
Patented July 12, 1921.
4 SHEETS—SHEET 1.
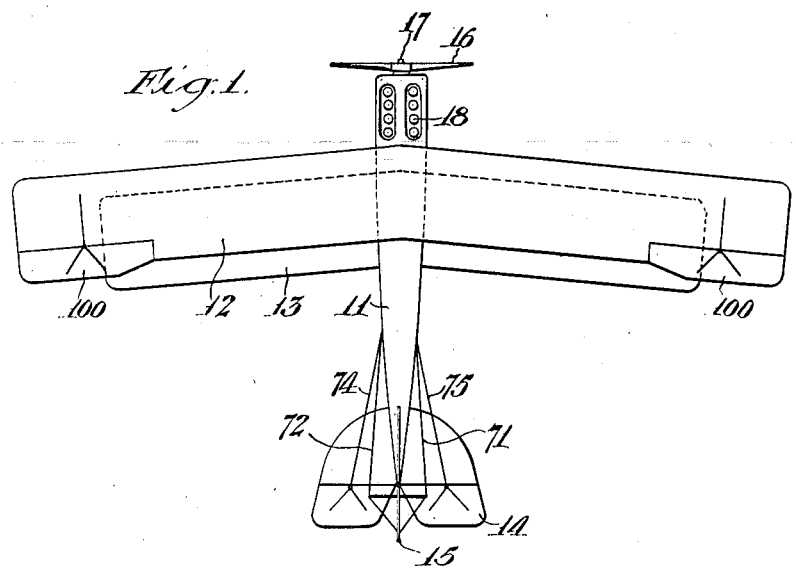
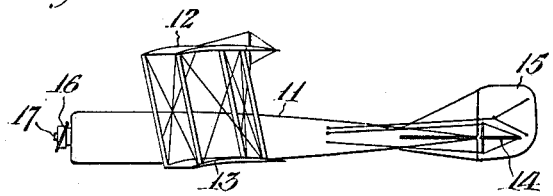
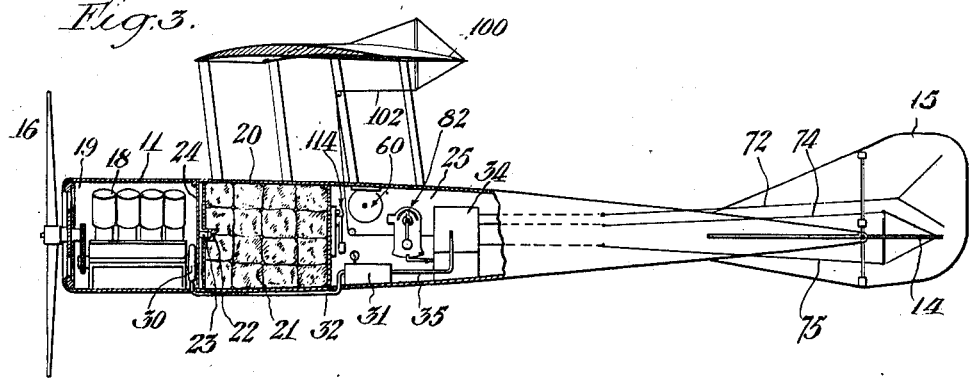
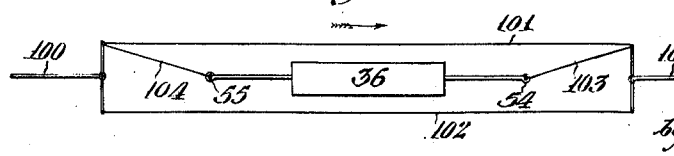
Inventors
Lloyd Giles
Sidney H. Woodruff
by Wilmur Harris
Attorneys L. GILES AND S. H. WOODRUFF.
AERIAL TORPEDO.
APPLICATION FILED JULY 23, 1917.
1,384,559.
Patented July 12, 1921.
4 SHEETS—SHEET 2.
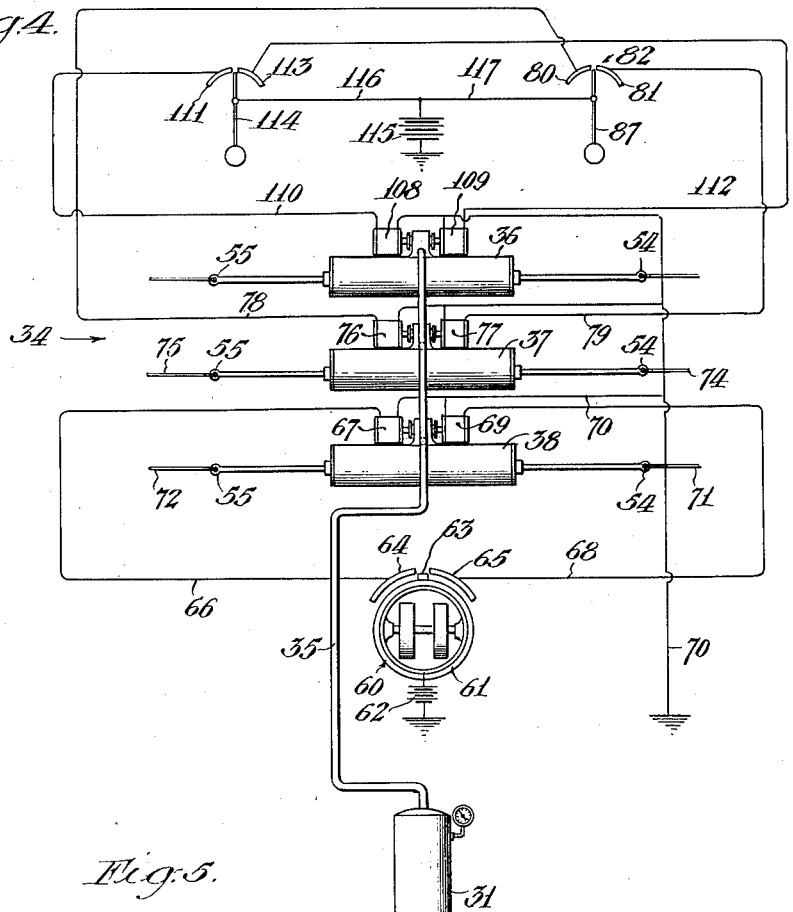
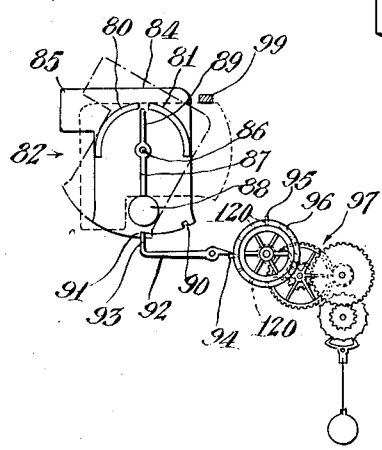
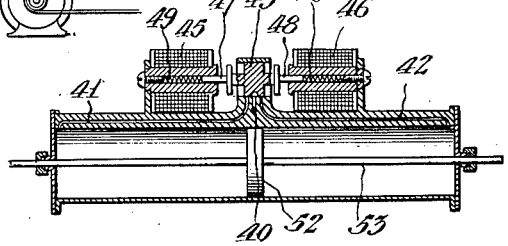
Inventors
Lloyd Giles
Sidney H. Woodruff
by William Harris
Attorneys L. GILES AND S. H. WOODRUFF.
AERIAL TORPEDO.
APPLICATION FILED JULY 23, 1917.
1,384,559.
Patented July 12, 1921.
4 SHEETS—SHEET 3.
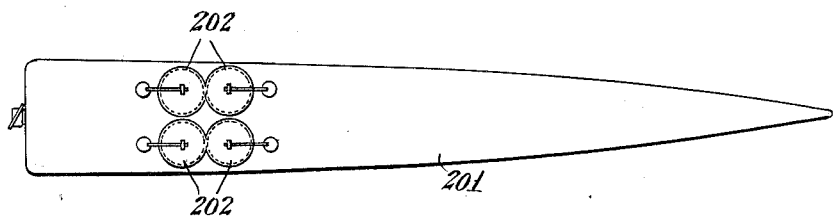
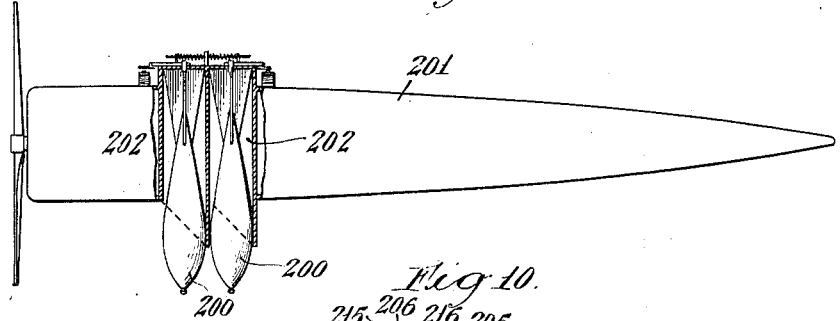
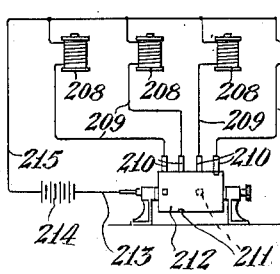
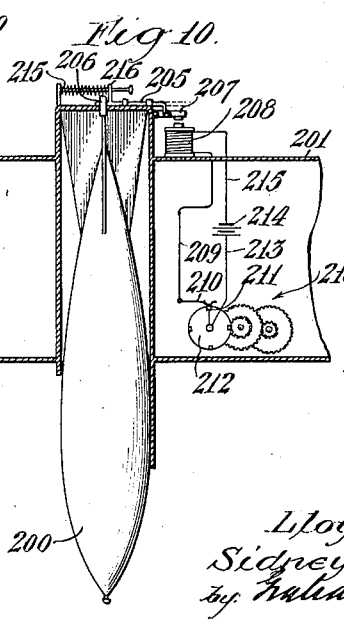
Inventors
Lloyd Giles
Sidney H. Woodruff
by William Harris
Attorneys

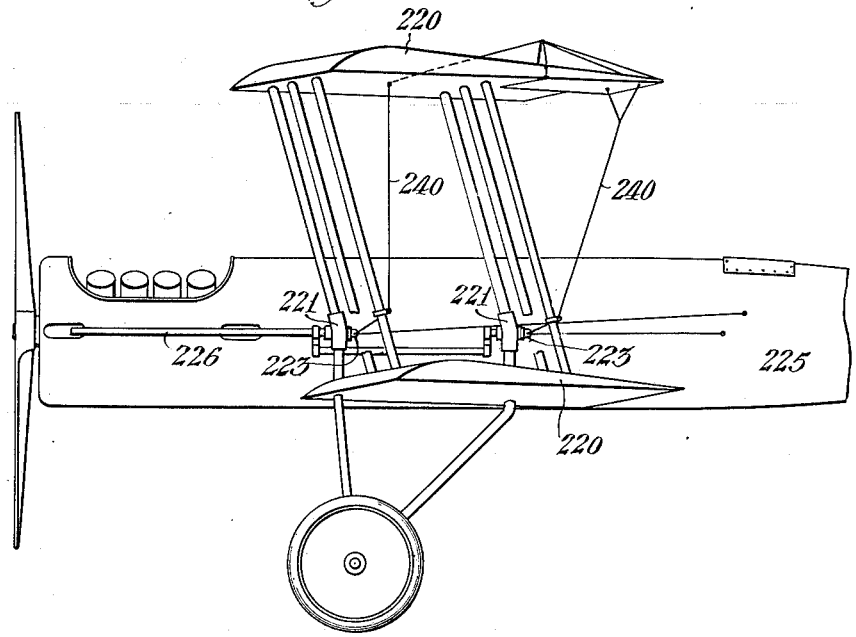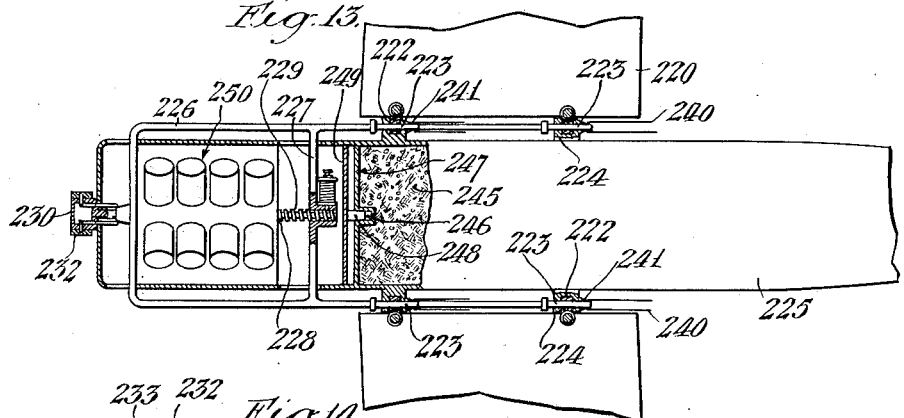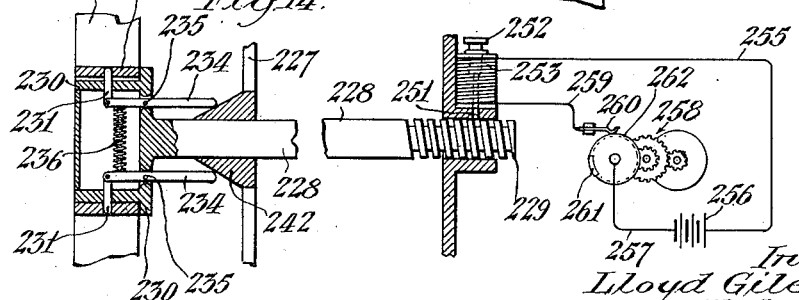

UNITED STATES PATENT OFFICE.

LLOYD GILES AND SIDNEY H. WOODRUFF, OF LOS ANGELES, CALIFORNIA.

AERIAL TORPEDO.

1,384,559.

Specification of Letters Patent.

Patented July 12, 1921.

Application filed July 23, 1917. Serial No. 182,175.

*To all whom it may concern:*

Be it known that we, LLOYD GILES and SIDNEY H. WOODRUFF, both citizens of the United States, and both residing at Los Angeles, in the county of Los Angeles and State of California, have invented a new and useful Aerial Torpedo, of which the following is a specification.

Our invention relates to the art of warfare, being more particularly an aerial torpedo, which is designed to carry large quantities of explosive great distances over the enemy's lines, for the purpose of destroying bases, ammunition depots and such places valuable to the enemy. The principal object of our invention is to produce an aerial torpedo having the general form and characteristics of an aeroplane, which, however, does not require an aviator, being entirely automatic in its operation, the control of the flight of the torpedo being wholly regulated by mechanism carried in the torpedo. To obtain this object we construct an aeroplane having a fuselage, the ordinary planes having ailerons, a tail piece, rudder, and the ordinary propeller, all of which are automatically operated from suitable mechanism carried in the fuselage.

Another object of our invention is to produce a torpedo of the class described which may be set to travel a predetermined distance after which the torpedo is automatically directed toward the ground.

Referring to the drawings which are for illustrative purposes only.

Figure 1 is a diagrammatic plan view of a device embodying a form of our invention.

Fig. 2 is a side elevation of the device shown in Fig. 1.

Fig. 3 is an enlarged side view partially in section of the device shown in Fig. 2.

Fig. 4 is a diagrammatic view of the controlling device.

Fig. 5 is a face view of one of the stabilizers.

Fig. 6 is a sectional view of one of the air cylinders.

Fig. 7 is a diagrammatic view of the ailerons operating connections.

Fig. 8 is a diagrammatic plan view of a modified form of torpedo.

Fig. 9 is a side elevation of the device shown in Fig. 8 partly in section.

Fig. 10 is an enlarged view of a portion of the device showing a shell releasing mechanism.

Fig. 11 is a diagram of electrical connections for the modified form of our invention.

Fig. 12 is a side elevation of another modified form of our invention.

Fig. 13 is a plan view partly in section of the same and,

Fig. 14 is an enlarged sectional view of a portion of the device.

The device consists of a fuselage 11, upper and lower planes 12 and 13 respectively, and a tail piece 14 pivotally connected to the rear end of the fuselage, a rudder 15 pivotally connected to the rear end of the fuselage, and a propeller 16. The propeller 16 is mounted on a shaft 17 driven by an internal combustion engine 18 placed in a forward compartment 19 in the fuselage 11. Directly behind the compartment 19 in the fuselage is a chamber 20 filled with gun cotton or other high explosive 21, a cap 22 being provided arranged to be fired by a firing pin 23 mounted on a wall 24. Arranged behind the chamber 20 is a compartment 25 in which are placed controlling instruments for the operation of the torpedo. These instruments in general consist of instruments which control the elevation of flight, the length of flight, the direction of flight, and stabilizing instruments.

The control of the flight of the torpedo is accomplished by the use of compressed air. A compressor 30 is driven by the engine 18 supplying air to a storage tank 31 through a pipe 32, which tank supplies air under pressure to a series of cylinders diagrammatically indicated in Fig. 3 at 34.

The three cylinders 36, 37, and 38 respectively as shown in Fig. 4 each receive air under pressure from the pipe 35 and each have an inlet port 40 and ports 41 and 42, the latter ports 41 and 42 being each connected to the opposite ends of the cylinder, the passage of air from the port 40 to either of the ports 41 or 42 being controlled by a valve 43.

Arranged in connection with each cylinder are two solenoids 45 and 46, the cores 47 and 48 of each respectively are mounted on the valve member 43. Each of the cores are held in outer position by means of coiled springs 49, it being understood that if one of the solenoids is operated its associated core will move inwardly causing a consequent movement of the valve in the same direction, which movement of the valve connects the inlet port 40 with either the port 41 or the port 42 according to the direction of movement thereby delivering air under pressure to the end of the cylinder with which the port is connected and opening the port at the opposite end of the cylinder.

Each cylinder is provided with a piston 52 having a piston rod 53 which projects through the opposite ends of the cylinder, the opposite ends of the piston rod being provided with eyes 54 and 55 for the purpose of attaching thereto cables by means of which the movable controlling parts of the torpedo are operated.

For the purpose of keeping the torpedo in its proper direction, a gyrostat 60 is mounted in the compartment 25, the ring 61 of the gyrostat being electrically connected to a battery 62. 63 designates a contact pin on the ring 61 which is adapted to be engaged by either of two segments 64 and 65 carried in any suitable place on the frame of the fuselage in front of the gyrostat, so arranged that any movement of the fuselage laterally will bring one of the segments 64 or 65 into contact with the pin 63 on the gyrostat, thereby making an electrical connection between the pin and segment.

Segment 64 is connected by means of a wire 66 with solenoid 67 on the cylinder 38, the segment 65 being connected by a wire 68 with the solenoid 69 on the cylinder 38, each of such solenoids 67 and 69 being grounded by means of wire 70.

The ends 54 and 55 of the piston rod in the cylinder 38 are connected by means of cables 71 and 72 respectively to the rudder 15. With this construction the turning movement of the aeroplane laterally during its flight will bring either of the segments 64 or 65 into contact with the pin 63, thereby closing an electrical circuit either through the wire 66 or the wire 68, which would energize the solenoid connected therewith, thereby operating the valve on the cylinder 38 to move the piston therein, which movement would be communicated to the cables 71 and 72 according to the direction of movement of the piston, thereby operating the rudder to bring the torpedo back to a straight line of travel, such line of travel having been predetermined and the gyrostat started in motion accordingly.

The elevation or angle of flight is controlled by the tail piece or elevator 14, the elevator having connected thereto two cables 74 and 75 which are connected to the eyes 54 and 55 respectively of the piston rod in the cylinder 37.

The solenoids 76 and 77 of the piston 37 are connected by wires 78 and 79 respectively to segments 80 and 81 on a stabilizer 82. This stabilizer 82 consists of a plate 84 which is pivotally connected to any stationary part of the fuselage, such plate 84 being weighted as indicated at 85 so that the same has a tendency to swing upon the pin 86 upon which the plate is mounted.

Freely mounted on the pin 86 is an arm or pendulum 87, the lower end of which is weighted as indicated at 88, an upper portion 89 being adapted to contact with either the segment 80 or the segment 81 as the case may be. The lower edge of the plate 84 is provided with a notch 90 and an abutment or stop 91 which is adapted to be engaged as hereinafter referred to, by means of a lever 92. An up-turned end 93 of the lever 92 forms a detent for engagement with the notch 90 or abutment 91. The opposite end of the lever 90 is adapted to be engaged by pins 94 and 95 which are mounted in the face of a wheel 96, such wheel 96 being driven by means of suitable clock work 97.

100 designates ailerons, there being one aileron at the outer rear edge of each end of the upper plane 12. The ailerons are connected together by means of cables 101 and 102 as diagrammatically shown in Fig. 7. One of the ailerons is connected by a cable 103 with the eye 54 on the end of the piston rod of the cylinder 36. The eye 55 on the opposite end of the piston rod is connected by a cable 104 with the other aileron, such arrangement of cables being so that the ailerons will move simultaneously one moving up and the other moving down as the same may be operated by the cylinder 36. The cylinder 36 is provided with a solenoid 108 and a solenoid 109, the cores of the two solenoids being mounted upon a valve for the purpose of controlling passage of air to the cylinder 36 as heretofore described.

The solenoid 108 is connected by means of a wire 110 to a segment 111 and the solenoid 109 is connected by a wire 112 with a segment 113. The segments 111 and 113 are mounted upon any fixed part of the fuselage and are adapted to be engaged by a pendulum 114, the pendulum 114 being connected to a battery 115 by means of a wire 116, the battery 115 being also connected by means of wire 117 with the pendulum 87 hereinbefore described.

The torpedo is operated in the following manner: The direction having been chosen, the tail piece is set at a proper angle to cause the torpedo to leave the ground, the angle at which the tail piece is set being maintained a predetermined length of time by means of the clock work 97, and when so set the detent 92 is placed in engagement with the notch 90 in the plate 84. The pins 94 and 95 are placed in threaded holes 120 in the wheel 96 so that the time of movement of the wheel before the first pin strikes the detent 92 is the time required for the torpedo to reach the elevation which has been predetermined for the further flight of the same.

When the pin 95 strikes the detent 92 the detent becomes disengaged from the notch 90 and the plate 84 swings from the dot and dash line position in Fig. 5 to the full line position, the detent 92 striking the abutment 91 and holding the plate from further movement. During the movement just described the plate is in the dot and dash line position, the pendulum 89 is making contact with the segment 80 which, through the electrical connection heretofore described, energizes the solenoid 76 thereby moving the valve on the cylinder 37 to admit air into one end of the said cylinder, the pendulum, however, when in the full line position shown in Fig. 5 is not in contact with either the segment 80 or 81, the solenoid 76 not being energized, the valve on the cylinder 37 returns to its normal position. The piston in such cylinder also returns to its normal position thereby operating cables 74 and 75 to bring the tail piece into horizontal position as shown in Fig. 3.

The pin 94 is placed apart from the pin 95 the necessary distance to permit a time interval to elapse before the pin strikes the detent 92 equal to the length of time required for the flight of the torpedo after reaching its proper elevation. At the termination of such period the pin 94 strikes the detent 92 moving it away from the abutment 91 on the plate 84, thereby permitting the plate to swing into the dotted line position shown in Fig. 5 against a stop 99, in which position the pendulum 89 makes contact with the segment 81 and other electrical connections heretofore referred to, operate the piston in cylinder 37 to move the tail piece so that the torpedo takes a vertical flight downward. The contact of the pendulum with the segment 81 takes place only during a one-quarter turn of the torpedo due to the shape of the segment, so that when the torpedo is headed toward the earth the pendulum has broken contact with the segment and the tail piece returns to the normal position as heretofore explained. Upon striking the ground or other obstacle, the impact moves the wall 24 of the fuselage rearwardly driving the firing pin 23 into the cap 22 which explodes the gun cotton 21.

During the flight it is understood that any variation in the lateral balance of the torpedo is accommodated by the action of the ailerons before referred to, and their controlling mechanism, and that any variation in the lateral course of the torpedo is accommodated by the action of the gyrostat and its associating mechanism hereinbefore referred to, so that with mechanism constructed as before described, the torpedo may be set to travel a certain length of time upwardly after which it travels a predetermined length of time in a horizontal direction and finally changes its flight to a downward direction.

In the modified form of our invention shown in Figs. 8 to 11, inclusive, explosive shells, indicated at 200, are carried in the fuselage 201 each in a separate chamber 202. The shells 200 are held in vertical position so that the same may be discharged vertically in a downward direction. Each shell is held by means of a rod 205 which engages an eye 206 on the upper end of the shell. The rod 205 is held in engagement with the eye 206 by means of a trip arm 207 adapted to be operated by means of a magnet 208, there being a magnet 208 for each shell. Each magnet 208 is connected by means of a wire 209 with a contact pin 210 each pin 210 being in turn adapted to close an electric circuit by engaging contacts 211 fixed in drum 212, the contacts 211 in the drum 212 being electrically connected by a wire 213 with a battery 214, the battery in turn being connected by a wire 215 with the respective magnets 208. The drum 212 is rotated by clock mechanism indicated by 216 so that electrical contact is made between the contact pins 210 and the contacts 211 on the drum at intervals, which connection releases a shell through the operation of its associated magnet, it being understood that the time of releasing the shell may be varied according to the position of the contacts 211 on the drum 212.

215 designates a spring which presses against an arm 216 on the rod 205 so that when the trip arm is operated and the rod 205 released, the spring moves the rod 205 out of engagement with the eye 206. It is understood that the shells are released at intervals during the period of flight which intervals are regulated by the speed of rotation of the drum 212.

In the modified form of my invention shown in Figs. 12 to 14, inclusive, the torpedo is designed to travel a predetermined distance, the same mechanism being used for the purpose of controlling the direction of flight, the angle of flight, and stabilizing, but at a certain point in the flight the wing sections of the planes are automatically detached from the fuselage and the propeller is disconnected from the engine so that the torpedo drops downwardly exploding its charge by contact with the earth.

Referring to the Figs. 12 to 14, inclusive, the wing sections 220 are provided with brackets 221 which are formed with an eye 222 engaged by rods 223 slidably supported in brackets 224 secured to the fuselage 225. The rods 223 form extensions of a yoke 226, said yoke being provided with a cross bar 227 through which the end of the engine shaft 228 extends. The end of the engine shaft is threaded as indicated at 229 for the purpose hereinafter referred to.

The outer end of the yoke 226 is provided with a cone 242 through which the engine shaft freely passes. The outer end of the engine shaft terminates in a drum 230 through which extend pins 231 to engage the sleeve 232 of the propeller 233. The pins 231 are pivotally connected to levers 234 which are pivotally mounted at 235 in the drum 230, the pins on the end of the levers 234 engaging the cone 242, being elastically held in such position by a coiled spring 236.

The cables 240, which operate the ailerons, extend through openings formed in the bars 223, such openings being directly behind the tapered end 241 of the brackets 224, such tapered end 241 being preferably tapered to a knife edge so that a forward movement of the bars 223 will cut the cable against such knife edge.

245 designates a charge of explosives in the fuselage, a cap 246 being provided in a wall 247 at the forward end of the charge, which cap is arranged to be fired by a pin 248 mounted on a wall 249 behind the engine 250. 251 designates a pin secured to the lower end of the core 252 of a solenoid 253. The solenoid is connected in an electric circuit 255 having a battery 256, one wire 257 of which is connected to clock mechanism 258, and a wire 259 being connected to a contact finger 260, the contact finger being in a position to be engaged by a contact plate 261 on a wheel 262 forming a part of the clock mechanism, it being understood that the ailerons, the rudder, and the elevator are controlled by the same form of device heretofore referred to with reference to the other forms of my invention.

The clock mechanism 258 is set so that contact will be made between the finger 260 and the plate 261 a predetermined length of time after the beginning of the flight, and when such contact is made, the solenoid 253 is energized, the pin 251 enters the threads on the shaft 228 and as such shaft is revolving with the engine, the yoke 226 is moved forwardly which action pulls the rods 223 forwardly, the cables 240 being cut against the tapered portions 241 of the brackets 224, and at the same time the cone expands the levers 234 withdrawing the pins 231 from engagement with the sleeve 233 thereby releasing the propeller, which due to its rotary movement, flies off the end of the drum 230. As the rods 223 move forwardly they disengage the eyes 222, thereby disengaging the wing sections from the fuselage so that the fuselage being free of the wing sections and propeller, commences to fall and take a direct downward course due to the fact that the forward end of the same is heavier than the rear, and by contact with the earth the cap 246 is fired by the firing pin and the charge of explosives is set off.

We claim as our invention:—

1. An aerial torpedo comprising a fuselage; planes on the fuselage; a rudder on the fuselage; means for automatically controlling the rudder to keep the torpedo in a straight course; elevating mechanism on said fuselage; means for automatically moving said elevator into predetermined positions, said last named means consisting of a rotatable plate, contact segments on said plate, a pendulum arranged to contact with said segments, detent mechanism arranged to engage said plate, timing mechanism for said detent mechanism, a cylinder, a piston in said cylinder, a piston rod, means for connecting said rod to said elevator, a solenoid, electric connections between said solenoid and said pendulum and said segments, a valve on said cylinder, means for controlling the action of said valve by said solenoid, compressed air supply for said cylinder; a charge of explosives in said fuselage; and means for firing said charge after a lapse of a predetermined time.

2. An aerial torpedo comprising a fuselage; planes on the fuselage; a rudder on the fuselage; means for automatically controlling the rudder to keep the torpedo in a straight course; elevating mechanism on said fuselage; means for automatically moving said elevator into predetermined positions, said last named means consisting of a rotatable plate, contact segments on said plate, a pendulum arranged to contact with said segments, detent mechanism arranged to engage said plate, timing mechanism for said detent mechanism, a cylinder, a piston in said cylinder, a piston rod, means for connecting said rod to said elevator, a supply of compressed air, an electrically operated valve controlling the supply of compressed air to said cylinder, electrical connections between said segments and said electrically operated valve; a charge of explosives in said fuselage; and means for firing said charge after a lapse of a predetermined time.

3. An aerial torpedo comprising a fuselage; planes on the fuselage; a rudder on the fuselage; means for automatically controlling the rudder to keep the torpedo in a straight course; elevating mechanism on said fuselage; means for automatically moving said elevator into predetermined positions, said last named means consisting of a rotatable plate, contact segments on said plate, a pendulum arranged to contact with said segments, detent mechanism arranged to engage said plate, timing mechanism for said detent mechanism, a cylinder, a piston in said cylinder, means by which said piston actuates said elevator, a solenoid, electric connections between said solenoid and said pendulum and said segments, a valve on said cylinder, means for controlling the action of said valve by said solenoid, compressed air supply for said cylinder; a charge of explosives in said fuselage; and means for firing said charge after a lapse of a predetermined time.

4. An aerial torpedo comprising a fuselage; planes on the fuselage; a rudder on the fuselage; means for automatically controlling the rudder to keep the torpedo in a straight course; elevating mechanism on said fuselage; means for automatically moving said elevator into predetermined positions, said last named means consisting of a rotatable plate, contact segments on said plate, a pendulum arranged to contact with said segments, detent mechanism arranged to engage said plate, timing mechanism for said detent mechanism, a cylinder, a piston in said cylinder, means by which said piston actuates said elevator, a supply of compressed air, an electrically operated valve controlling the supply of compressed air to said cylinder, electrical connections between said segments and said electrically operated valve; a charge of explosives in said fuselage; and means for firing said charge after a lapse of a predetermined time.

5. An aerial torpedo comprising a fuselage; planes on the fuselage; a rudder on the fuselage; means for automatically controlling the rudder to keep the torpedo in a straight course; elevating mechanism on said fuselage; means for automatically moving said elevator into predetermined positions, said last named means consisting of contact segments, a pendulum arranged to contact with said segments, means for changing the position of segments after a specified time, a cylinder, a piston in said cylinder, a piston rod, means for connecting said rod to said elevator, a solenoid, electric connections between said solenoid and said pendulum and said segments, a valve on said cylinder, means for controlling the action of said valve by said solenoid, compressed air supply for said cylinder; a charge of explosives in said fuselage; and means for firing said charge after a lapse of a predetermined time.

6. An aerial torpedo comprising a fuselage; planes on the fuselage; a rudder on the fuselage; means for automatically controlling the rudder to keep the torpedo in a straight course; elevating mechanism on said fuselage; means for automatically moving said elevator into predetermined positions, said last named means consisting of contact segments, a pendulum arranged to contact with said segments, means for changing the position of segments after a specified time, a cylinder, a piston in said cylinder, a piston rod, means for connecting said rod to said elevator, a supply of compressed air, an electrically operated valve controlling the supply of compressed air to said cylinder, electrical connections between said segments and said electrically operated valve; a charge of explosives in said fuselage; and means for firing said charge after a lapse of a predetermined time.

7. An aerial torpedo comprising a fuselage; planes on the fuselage; a rudder on the fuselage; means for automatically controlling the rudder to keep the torpedo in a straight course; elevating mechanism on said fuselage; means for automatically moving said elevator into predetermined positions, said last named means consisting of contact segments, a pendulum arranged to contact with said segments, means for changing the position of segments after a specified time, a cylinder, a piston in said cylinder, means by which said piston actuates said elevator, a solenoid, electric connections between said solenoid and said pendulum and said segments, a valve on said cylinder, means for controlling the action of said valve by said solenoid, compressed air supply for said cylinder; a charge of explosives in said fuselage; and means for firing said charge after a lapse of a predetermined time.

8. An aerial torpedo comprising a fuselage; planes on the fuselage; a rudder on the fuselage; means for automatically controlling the rudder to keep the torpedo in a straight course; elevating mechanism on said fuselage; means for automatically moving said elevator into predetermined positions, said last named means consisting of contact segments, a pendulum arranged to contact with said segments, means for changing the position of segments after a specified time, a cylinder, a piston in said cylinder, means by which said piston actuates said elevator, a supply of compressed air, an electrically operated valve controlling the supply of compressed air to said cylinder, electrical connections between said segments and said electrically operated valve; a charge of explosives in said fuselage, and means for firing said charge after a lapse of a predetermined time.

In testimony whereof, the said LLOYD GILES has hereunto set his hand at Los Angeles, California, this 16th day of July, 1917, and the said SIDNEY H. WOODRUFF has hereunto set his hand at Los Angeles, California, this 16th day of July, 1917.

LLOYD GILES.
SIDNEY H. WOODRUFF.